(12) United States Patent
Lindoff et al.

(10) Patent No.: US 10,285,077 B2
(45) Date of Patent: May 7, 2019

(54) METHOD, COMMUNICATION DEVICE AND COMPUTER PROGRAM

(71) Applicant: Telefonaktiebolaget LM Ericsson (Publ), Stockholm (SE)

(72) Inventors: Bengt Lindoff, Bjärred (SE); Fredrik Gunnarsson, Linköping (SE); Stefano Sorrentino, Solna (SE); Stefan Wänstedt, Luleå (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 98 days.

(21) Appl. No.: 15/031,038

(22) PCT Filed: Oct. 29, 2014

(86) PCT No.: PCT/EP2014/073266
§ 371 (c)(1),
(2) Date: Apr. 21, 2016

(87) PCT Pub. No.: WO2015/063185
PCT Pub. Date: May 7, 2015

(65) Prior Publication Data
US 2016/0255515 A1    Sep. 1, 2016

Related U.S. Application Data

(60) Provisional application No. 61/898,084, filed on Oct. 31, 2013.

(51) Int. Cl.
*H04W 24/02*    (2009.01)
*H04W 76/14*    (2018.01)
(Continued)

(52) U.S. Cl.
CPC .......... *H04W 24/02* (2013.01); *H04L 5/0048* (2013.01); *H04W 48/16* (2013.01);
(Continued)

(58) Field of Classification Search
CPC . H04W 24/02; H04W 48/16; H04W 74/0833; H04W 56/001; H04W 76/023; H04W 76/14; H04L 5/0048
See application file for complete search history.

(56) References Cited

U.S. PATENT DOCUMENTS 9,215,693 B2    12/2015 Ahn et al.
9,699,749 B2 *   7/2017 Chae ................ H04W 56/0015
(Continued)

FOREIGN PATENT DOCUMENTS

CN      102640553 A     8/2012
WO    2013130052 A1     9/2013
(Continued)

OTHER PUBLICATIONS

International Search Report and Written Opinion dated May 25, 2016 for PCT International Application Serial No. PCT/EP2016/052526, International Filing Date—Feb. 5, 2016 consisting of 14-pages.
(Continued)

*Primary Examiner* — Min Jung
(74) *Attorney, Agent, or Firm* — Christopher & Weisberg, P.A.

(57) ABSTRACT

A method for a device-to-device enabled cellular communication device arranged to operate with a cellular radio access network is disclosed. The method comprises determining a physical layer metric based on at least one potentially received signal from a controlling node of the cellular radio access network; determining based on the physical layer metric whether the cellular communication device is in coverage or out of coverage of the controlling node; and either, if the cellular communication device is determined to be in coverage of the controlling node, using device-to-device resources assigned from the controlling node, or, if the cellular communication device is determined to be out of
(Continued)

coverage of the controlling node, using device-to-device resources which are preconfigured for out of coverage use. A communication device and a computer program are also disclosed.

18 Claims, 7 Drawing Sheets

(51) Int. Cl.
*H04L 5/00* (2006.01)
*H04W 48/16* (2009.01)
*H04W 56/00* (2009.01)
*H04W 74/08* (2009.01)

(52) U.S. Cl.
CPC ..... *H04W 56/001* (2013.01); *H04W 74/0833* (2013.01); *H04W 76/14* (2018.02)

(56) References Cited

U.S. PATENT DOCUMENTS

| | | | |
|---|---|---|---|
| 2010/0135176 A1 | 6/2010 | Kazmi et al. | |
| 2013/0114531 A1 | 5/2013 | Ahn et al. | |
| 2013/0223356 A1 | 8/2013 | Khoshnevis et al. | |
| 2014/0328329 A1* | 11/2014 | Novlan | H04W 72/042 370/336 |
| 2015/0043448 A1* | 2/2015 | Chatterjee | H04W 8/005 370/329 |
| 2015/0271856 A1* | 9/2015 | Tong | H04W 16/26 455/426.1 |
| 2015/0327240 A1 | 11/2015 | Yamada et al. | |
| 2015/0358894 A1 | 12/2015 | Berggren et al. | |
| 2016/0242144 A1* | 8/2016 | Adachi | H04W 76/14 |
| 2016/0262142 A1* | 9/2016 | Nagata | H04W 8/005 |
| 2016/0316487 A1* | 10/2016 | Kalhan | H04W 72/1278 |
| 2016/0374068 A1* | 12/2016 | Kim | H04W 72/04 |

FOREIGN PATENT DOCUMENTS

| | | |
|---|---|---|
| WO | 2014045832 A1 | 3/2014 |
| WO | 2015063185 A1 | 5/2015 |

OTHER PUBLICATIONS

3GPP TSG-RAN WG1, R1-060105, Agenda item: 5.1.3.4, Source: Ericsson, Title: "E-UTRA Cell Search", Document for Discussion and Decision, Helsinki, Finland, Jan. 23-25, 2006 consisting of 7-pages.

3GPP TS 36.300 V11.2.0 (Jun. 2012) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11) Jul. 2, 2012 consisting of 201-pages.

3GPP TS 23.303 V12.3.0 (Dec. 2014) 3rd Generation Partnership Project; Technical Specification Group Services and System Aspects; Proximity-based services (ProSe); Stage 2 (Release 12) Dec. 17, 2014 consisting of 62-pages.

International Search Report and Written Opinion dated Apr. 16, 2015 PCT International Application Serial No. PCT/EP2014/073266, International Filing Date—Oct. 29, 2014 consisting of 13-pages.

3GPP TR 22.803 V12.2.0 (Jun. 2013) 3rd Generation Partnership Project; Technical Specification Group Services and System Aspects; Feasibility study for Proximity Services (ProSe) (Release 12) Mar. 14, 2012 consisting of 45-pages.

3GPP TSG-RAN WG1 Meeting #74, R1-133496, Title: "D2D Synchronization—Out of network coverage/partial network coverage", Agenda item: 7.2.8.1, Source: Nokia, NSN, Conference Location and Date: Barcelona, Spain, Aug. 19-23, 2013 consisting of 2-pages.

Office Action dated Dec. 1, 2017 in related U.S. Appl. No. 14/915,829 consisting of 20-pages.

3GPP TSG-RAN WG4 Meeting #74 R4-151126, Source: Ericsson, Qualcomm Incorporated, Title: RRM requirements for ProSe, Conference Location and Date: Athens, Greece, Feb. 9-13, 2015 consisting of 28-pages.

State Intellectual Property Office of the People's Republic of China First Office Action and Search report, dated Sep. 28, 2018 issued in Application No. 2014800601143, consisting of 12 pages.

Mexican Office Action related to Application No. MX/a/2016/005444, dated May 7, 2018, consisting of 5 pages with an English translation.

* cited by examiner

METHOD, COMMUNICATION DEVICE AND COMPUTER PROGRAM

TECHNICAL FIELD

The present invention generally relates to a method for a device-to-device (D2D) enabled cellular communication device arranged to operate with a 3$^{rd}$ Generation Partnership Program (3GPP) Long Term Evolution (LTE) cellular radio access network (RAN), such a communication device, and a computer program for implementing the method. In particular, the invention relates to monitoring of network coverage for device-to-device communication.

BACKGROUND

D2D communications in LTE is currently being specified. One usage for D2D is for National Security, Public Safety (NSPS) and hence the D2D should be able to use both Inside Cellular Network Coverage (IC) as well as outside cellular NW coverage (OoC). Different D2D transmission principles, mainly time/frequency resource assignment and receiver behaviour, will be used for IC and OoC respectively. It is therefore desirable for a device to determine whether it is IC or OoC.

SUMMARY

The invention is based on the understanding that proper determination whether a communication device, which is enabled for device-to-device (D2D) cellular communication and arranged to operate with a cellular radio access network, e.g. a 3rd Generation Partnership Program (3GPP) Long Term Evolution (LTE) cellular radio access network, is in cellular coverage or out of coverage for properly using D2D resources. This enables for proper resource assignment for D2D communication, which in turn provides for D2D communication in a way that is feasible and limits interference.

According to a first aspect, there is provided a method for a device-to-device enabled cellular communication device arranged to operate with a cellular radio access network. The method comprises determining a physical layer metric based on at least one potentially received signal from a controlling node of the cellular radio access network; determining based on said physical layer metric whether the cellular communication device is in coverage or out of coverage of the controlling node; and either, if the cellular communication device is determined to be in coverage of the controlling node, using device-to-device resources assigned from the controlling node, or, if the cellular communication device is determined to be out of coverage of the controlling node, using device-to-device resources which are preconfigured for out of coverage use.

The determining based on the physical layer metric may comprise determining whether a state or value associated with the metric has occurred. The determining based on the physical layer metric may comprise comparing the value with a threshold and/or mapping the state to whether the cellular communication device is in coverage or out of coverage of the controlling node.

The physical layer metric may comprise a Random Access Response received from the controlling node, and the state associated with the metric comprises whether the Random Access Response is received or not. The cellular communication device may be determined to be in coverage of the controlling node if the Random Access Response was received within a predetermined number of Random Access attempts.

The physical layer metric may comprise a synchronisation signal or a pilot signal received from the controlling node and filtered over a predetermined time, and the value associated with the metric may comprise a signal level or signal-to-noise-and-interference-ratio of the synchronisation signal or pilot signal, and the cellular communication device may be determined to be in coverage of the controlling node if the signal level or signal-to-noise-and-interference-ratio is above the threshold. The synchronisation signal may comprise any of a Primary Synchronisation Signal and a Secondary Synchronisation Signal. The pilot signal may be a Common Reference Signal/Symbols.

The physical layer metric may comprise a broadcast signal received from the controlling node, and the state associated with the metric may comprise whether the broadcast signal is decodable or not. The broadcast channel may comprise any of a Master Information Block and a System Information Block. The threshold level may be determined as a level at which the broadcast signal Block Error Rate is above a threshold. The cellular communication device may be determined to be in coverage of the controlling node if the broadcast signal was decoded within a predetermined time interval.

The physical layer metric may comprise a control channel received from the controlling node, and the state associated with the metric may comprise whether the control channel is decodable or not. The control channel may comprise any of a Physical Hybrid-ARQ Indicator Channel, a Physical Downlink Control Channel and a Physical Format Indicator Channel. The cellular communication device may be determined to be in coverage of the controlling node if the control channel was decoded within a predetermined time interval.

The method may further comprise determining a signal level on transmit resources assigned for uplink, wherein the metric may comprise the determined signal level. The cellular communication device may be determined to be out of coverage of the controlling node if the signal level is below the threshold.

The cellular communication device may be in an idle mode of operation in relation to the controlling node.

The cellular communication device may be camping on the controlling node.

The method may further comprise sending the determination whether the cellular communication device is in coverage or out of coverage of the controlling node to a layer above a physical layer of the cellular communication device. When the determination is that the cellular communication device is out of coverage, the method may proceed with transmission of at least one of a device-to-device beacon signal and a device-to-device broadcast communication using the pre-configured resources.

The cellular radio access network may be a 3GPP LTE radio access network.

According to a second aspect, there is provided a communication device for operating with a 3GPP LTE cellular radio access network and enabled for device-to-device communication. The communication device comprises a receiver arranged to receive at least one potential signal from a controlling node of the cellular radio access network; and a controller arranged to determine a physical layer metric and based on said physical layer metric whether the cellular communication device is in coverage or out of coverage of the controlling node according to the first aspect.

According to a third aspect, there is provided a computer program comprising instructions which, when executed on a processor of a communication apparatus, causes the communication apparatus to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Some Abbreviations
FDD Frequency Division Duplex
TDD Time Division Duplex
UL Uplink
DL Downlink
PDCCH Physical Downlink Control Channel
BLER Block Error Rate
NW Network
RRC Radio Resource Controller
SIR Signal-to-Interference Ratio
SINR Signal-to-Interference-and-Noise-Ratio
CRS Cell-specific (common) Reference Signal
DMRS Demodulation Reference Signal
PHICH Physical Hybrid-ARQ Indicator Channel
PCFICH Physical Format Indicator Channel
SIM Subscriber Identification Module
TX Transmitter
RX Receiver
TRX Transceiver
UE User Equipment
RLF Radio Link Failure
RLM Radio Link Monitoring Other abbreviations are explained as they appear throughout the text.

Although the approach of enabling D2D communications as a means of relaying in cellular networks was proposed by some early works on ad hoc networks, the concept of allowing local D2D communications to (re)use cellular spectrum resources simultaneously with on-going cellular traffic is relatively recently addressed. Because the non-orthogonal resource sharing between the cellular and the D2D layers has the potential of reuse gain and proximity gain, while at the same time increasing the resource utilization, D2D communications underlying cellular networks has received considerable interest in the recent years.

Specifically, in 3GPP LTE networks, D2D, communication can be used in commercial applications, such as cellular network offloading, proximity based social networking, or in public safety situations in which first responders need to communicate with each other and with people in the disaster area, which is addressed in the feasibility study of 3GPP TR 22.803.

D2D communication entities using an LTE Direct link may reuse the same physical resource blocks (PRB), i.e. frequency/time (f/t) resources, as used for cellular communications either in the downlink or in the uplink or both. The reuse of radio resources in a controlled fashion can lead to the increase of spectral efficiency at the expense of some increase of the intra-cell interference. Typically, D2D communicating entities use UL resources such as UL PRBs or UL time slots, but conceptually it is possible that D2D communications takes place in the cellular DL spectrum or in DL time slots. For ease of presentation, in the present disclosure we assume that D2D links use uplink resources, such as uplink PRBs in an FDD or uplink time slots in an a cellular TDD system, but the approaches demonstrated herein would carry over to cases in which D2D communications take place in DL spectrum as well.

Figure 1:
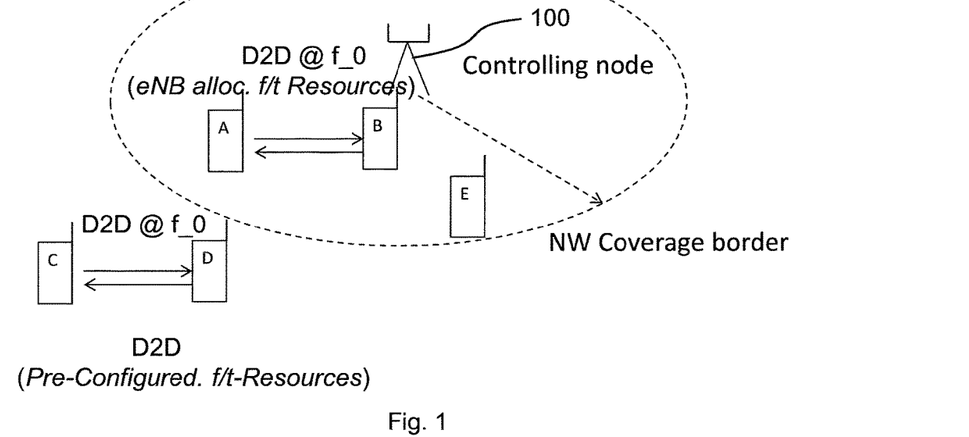
FIG. 1 shows the principles for D2D communication within LTE.

FIG. 1 shows the principles for D2D communication within LTE. A controlling node 100, i.e. eNode B or Cluster Head, i.e. a UE performing controlling node tasks, is controlling the communication on a frequency carrier f_0. In a first scenario, devices A and B are communicating directly via a D2D link, and both devices are inside NW coverage of the controlling node. The controlling node then allocates the radio resources to use for D2D communication for D2D. In the second scenario at least one of devices C and D may have D2D communication outside any controlling node coverage. In this case the D2D communication is using pre-configured (by standard, or by device capabilities for instance) f/t-resources for D2D communication. Since the pre-configured resources may be used by other devices inside controlling node coverage, say device E communicating with controlling node, the D2D communication between devices C and D may start to interfere with the communication between device E and the controlling node, if devices C and D are coming into the controlling node coverage. It is important that a device can detect whether it is coming inside network coverage in a controlled way; that in order to minimize the risk for interference.

In order to know whether the device is In network Coverage (IC) or Out of network Coverage (OoC), the device needs to have a physical layer metric in order to determine it, since different procedures and protocols are defined for transmission of a discovery beacon, i.e. for D2D discovery, and D2D communication when in-coverage and out-of-coverage, i.e. start D2D transmission without a grant from the controlling node. Here, roughly described, in the IC scenario, the device is able to properly detect and connect to the cellular network, wherein the network may support by assigning resources for D2D communication, while in the OoC scenario, the device is not able to reliably detect and connect to the cellular network. Below, it is described that the determination may be performed proactively instead of determining from history whether the device was IC or OoC.

In LTE, devices in RRC_CONNECTED, i.e. in active mode, and served by a controlling node such as an eNodeB, are required to do Radio Link Monitoring (RLM) on the physical layer in order to detect whether the device is in-sync or out-of-sync with respect to the serving cell. RLM is made using Down-Link (DL) Common Reference Signals (CRS) and based on an estimated SIR, the SIR estimate is mapped to a hypothetical PDCCH BLER, where the mapping may be a function of Antenna and system bandwidth configuration. Based on that estimated PDCCH BLER, the device determines in-sync or out-of-sync on the physical layer, which determination then is reported to higher layer for further action. If Radio Link Failure (RLF) is declared at higher layer, the device then goes back to the RRC_IDLE state. The RLM is used for several purposes, for instance detection of whether the device goes out of coverage, but also gives a controlled way for the device to go back to RRC_IDLE mode in case synchronization is lost, due to some internal device sync problem, or due to for instance a failure of a handover process (between two controlling nodes). In the last two cases, the RLF declaration is made even if the device still may be inside NW coverage.

A first approach is to try to reuse the RLM for D2D for detecting whether the device is IC or OoC. However, several problems may be envisioned by reusing this out-of-sync definition for OoC detection in relation to D2D communication, for instance:

1. In case of an internal device problem or handover failure, the device may not be OoC even if RLF is declared, and hence may without proper OoC definition start using pre-configured D2D resources, that may introduce significant interference within the cell.

2. The RLF is only defined in RRC _CONNECTED, hence a device OoC as well as in RRC_IDLE will not perform RLM.

3. A conventional LTE device may have an internal NW coverage definition, in order to enable optimized cell search, etc., in order to reduce the power consumption. However, since nothing is standardized with respect to whether a device is IC or OoC, having no standardised definition may imply that latency in IC detection by certain devices may result in severe interference risk when using OoC pre-configured f/t resources under NW coverage.

The following disclosure demonstrates methods and apparatus for proper determination whether the device is in network coverage or not once a D2D discovery or D2D communication is going to be enabled by the device for the above discussed context.

According to some embodiments, the device monitors a metric associated with the NW coverage to at least one controlling node, and based on the metric determining whether the device is in coverage or out of coverage, e.g. if the metric is a above a first threshold, the device detects In NW coverage, and the device uses NW controlled resources for D2D operations, either as broadcasted by the controlling node, or as granted by the controlling node following an establishment of an active connection to the (detected) controlling node. In this example, if the metric is below the first threshold, out of NW coverage is declared and the UE adopts pre-configured frequency/time resources for D2D communication or D2D discovery and other algorithms that may be suitable for an OoC situation, e.g. extensive search for controlling nodes in proximity, or assumption of the role of controlling node, i.e. Cluster Head. The disclosure covers several different metrics and measurement procedures, and is described in further detail below.

Figure 2:
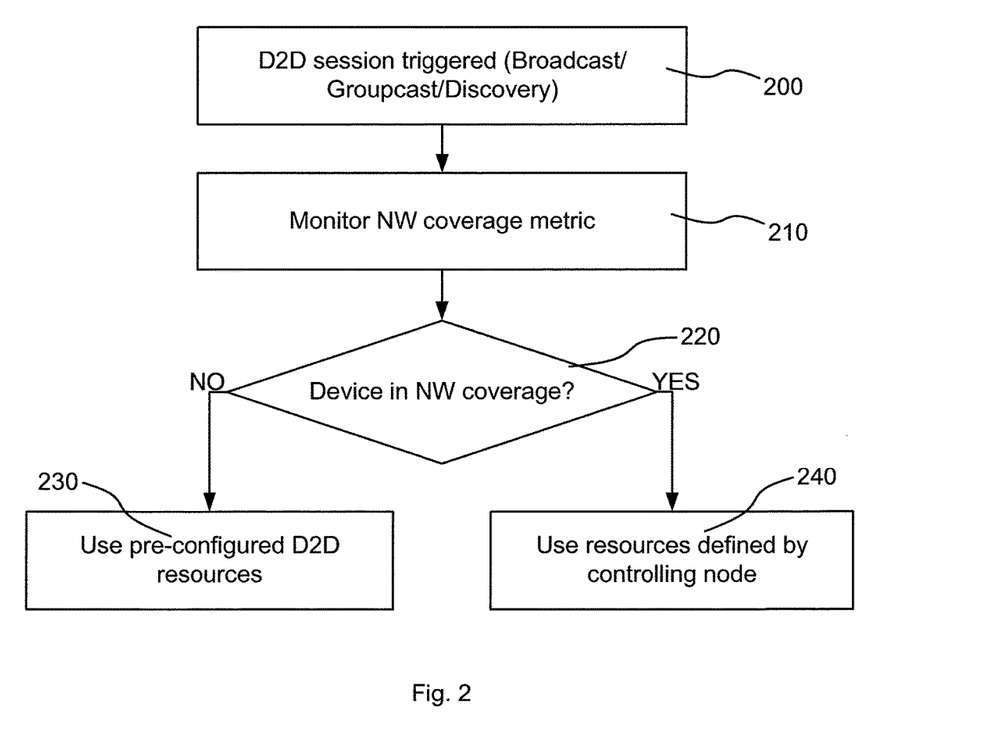
FIG. 2 shows a flow chart over a first embodiment for a device capable to operate in D2D communication (or D2D discovery) mode both in NW coverage as well as out of NW coverage.

FIG. 2 shows a flow chart over a first embodiment for a device capable to operate in D2D communication (or D2D discovery) mode both in NW coverage as well as out of NW coverage. Optionally, high layer triggers lower layer (like physical layer) that a D2D session is going to be started 200. Session means here that the device may transmit and/or receive signals including information and sequences for the purpose that another should be able to discover the device (Discovery), or transmit information via broadcast (to any device), groupcast (to a group of devices), or unicast (to a specific device). That trigger, makes a control unit inside the device to start monitor a metric associated to whether the device is inside or outside NW coverage 210. In other embodiments, the device, once enabled, and either in RRC_Idle (idle mode) or out of NW coverage (or in active mode), is monitoring the NW coverage metric all the time, and hence the triggering step 200 may be optional. The metric is monitored, and the device determines whether the device is in NW coverage, IC, or not 220. If the device determines it is IC, meaning there is at least one controlling node controlling the device (i.e. the device's camping cell, the serving cell; 220, YES) it uses time/frequency resources defined by the controlling node for D2D communication 240. If these resources are known to the device and the device have a grant to use them, typically the case when the device is in RRC_connected, i.e. active mode, it may start transmitting according to the configured D2D principles, i.e. what f/t resources to use, modulation and coding rate to use, etc. If these resources are known to the device via broadcast from the serving or camping cell, it may start transmitting according to the broadcasted D2D principles, i.e. broadcasted information related to D2D communication. If the device does not have a grant it may start to establish RRC_CONNECTED state, i.e. transmit a Random Access and further well known principles and procedures 240. However, if OoC is detected (220, NO) it may in some embodiments report to higher layer that may do some filtering over several, from lower (physical) layer, reported OoC events. Then, once the higher layer declares OoC (or in some embodiments, the lower layer itself declares the OoC), the device uses the pre-configured f/t resources for D2D transmission 230, where the pre-configuration may be defined by standard (but possibly frequency band dependent), or it may be defined by the device subscription (information in the SIM card for instance), or defined by earlier received default configuration from an earlier controlling node. Here, it should be noted that the controlling node may, when the device is IC, instruct and configure the device to use the pre-configuration although being IC. This may be desirable by the network in some situations.

Figure 3:
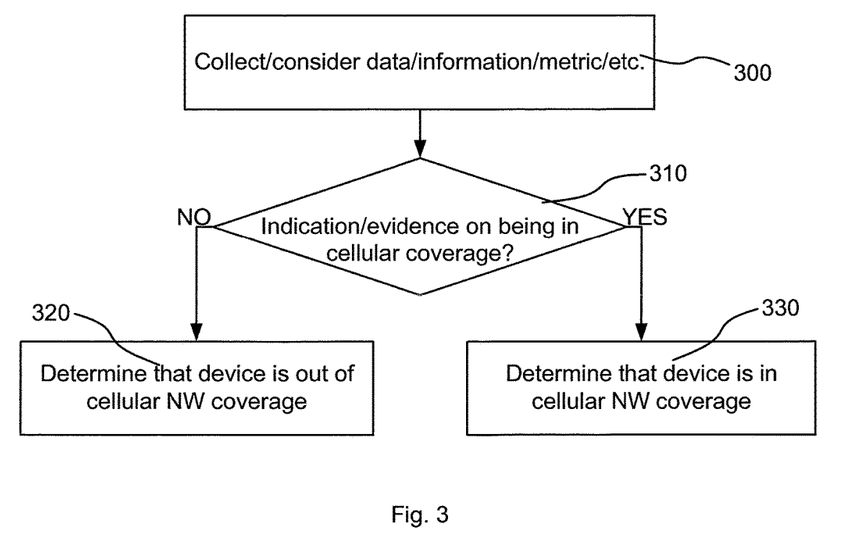
FIG. 3 is a flow chart which illustrates a simplified view of determination of a device being in coverage or out-of-coverage.

Thus, the determination step 220 implies use of resources in a way that is feasible and causes less interference. FIG. 3 illustrates a simplified view on this, which, when considered in view of the examples below, is intended to improve understanding of the examples. In step 300, data, information, metric, etc. is collected and/or considered. In step 310, it is determined from the data, information, metric, etc.

according to a used model whether there is an indication or evidence on whether being in coverage or out of coverage. This step 310 may be more or less complex, and may also include iterations of step 300. From this, the procedure either proceeds with the step of determining that the device is out of cellular coverage 320, which as demonstrated with reference to FIG. 2 implies a certain use of resources, or proceeds with the step of determining that the device is in cellular coverage 330, which, as also demonstrated with reference to FIG. 2, implies another way to determine use of resources.

Figure 4:
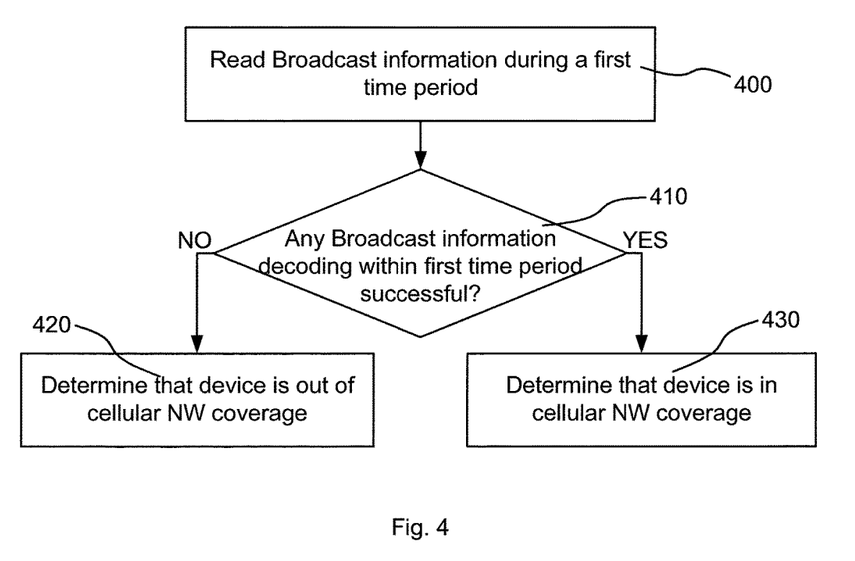
FIG. 4 is a flow chart which illustrates an example where metrics associated with a DL broadcast channel from a controlling node is used for determination.

FIG. 4 illustrates an example where metrics associated with a DL broadcast channel from a controlling node is used for determination. Broadcast signals (for instance Master information Blocks, MIB or System information Blocks, SIB, for instance SIB 1 or SIB related to D2D communication, e.g. SIB 18) from at least one controlling node, may be read 400 and if possible decoded. If MIB/SIB decoding is failed 410 (NO) over a configured time interval (e.g. 200 ms, e.g. defined by standard or configured by controlling node), OoC is determined 420. However, if at least one MIB/SIB is possible to decode 410 (YES) during that time interval, In Coverage is detected 430. In one embodiment, only one of the MIB or SIB is monitored, while in another embodiment, both MIB and SIB are monitored, and OoC is detected if one or both (two different embodiments) fails.

In the case the device is camping on a Cluster Head broadcasting synchronization signals as well as synchronization information blocks, i.e. D2DMIB/D2DSIB, it would then be able to decode these channels. This approach is mutatis mutandis applicable for the approach depicted in FIG. 4.

Figure 5:
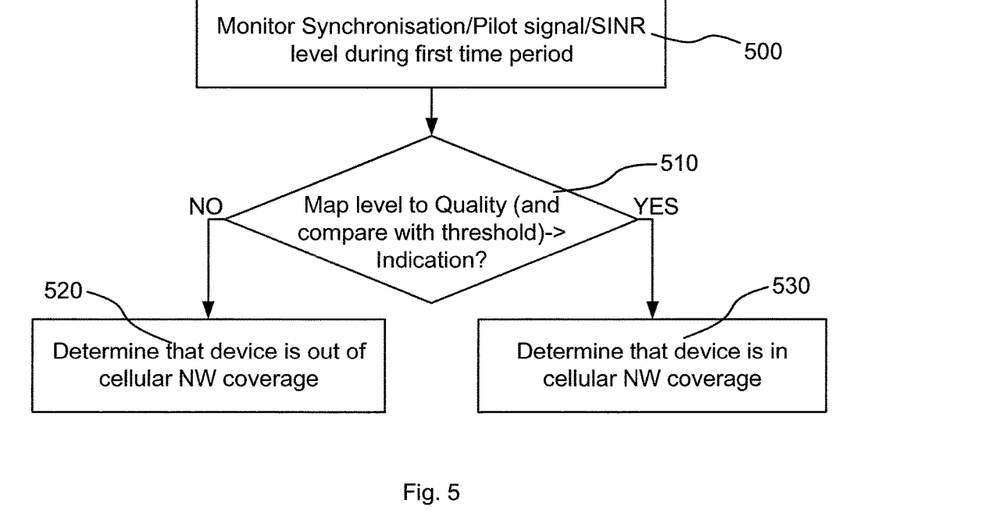
FIG. 5 is a flow chart which illustrates an example where metric associated with DL Synchronization signal/pilot signals from the controlling node is considered.

FIG. 5 illustrates an example where metric associated with DL Synchronization signal/pilot signals from the controlling node is considered. Synchronization signals, like Primary or Secondary Synchronization signal levels (or SINRs) or Pilot signal (CRS or DMRS) signal levels or SINR from at least one controlling node (eNode B, Cluster Head etc.) may be monitored 500. If filtered (e.g. over 200 ms, e.g. defined by standard or configured by controlling node) versions of the signal levels etc. indicates 510 (NO) no coverage, OoC is detected 520. Otherwise 510 (YES) IC is detected 530. The indication may be a threshold level. Furthermore, the threshold level may be determined as the level at which a broadcast channel (MIB/SIB) Block Error Rate (BLER) is above a threshold. The mapping may be determined as a function of antenna configuration, or pre-coding of the PSS/SSS relative the pre-coding of MIB/SIB, as these may be pre-coded in different ways. Also other ways to determine the threshold may be envisioned, for instance an absolute value of CRS, i.e. RSRP, may determine IC or OoC to any controlling node. If no controlling node RSRP is above, say −130 to −115 dBm (note that these are example numbers, and may be dependent on e.g. frequency band, etc.) OoC is detected 520, otherwise IC is detected 530.

Figure 6:
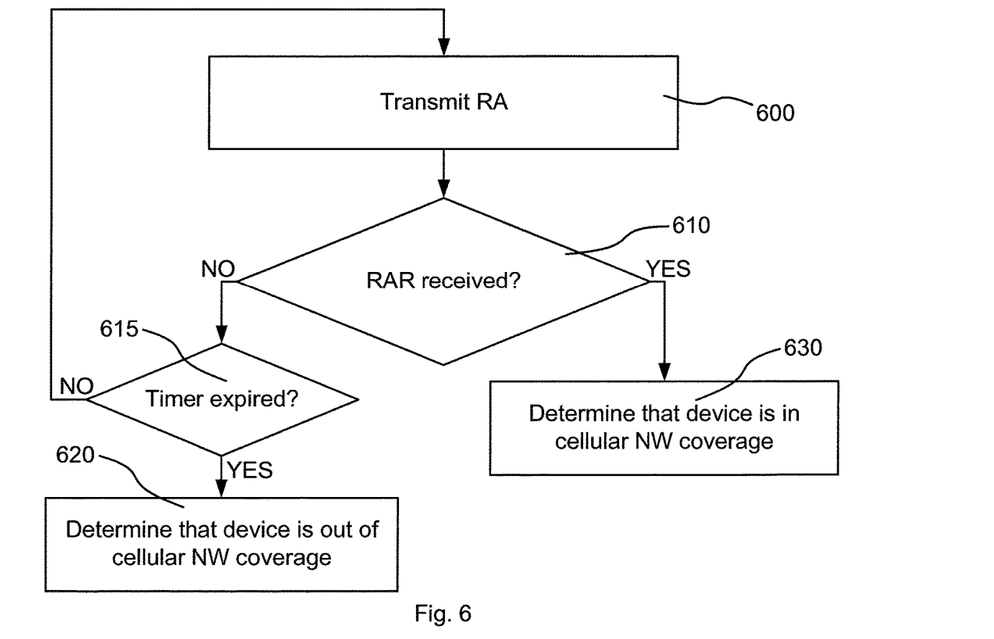
FIG. 6 is a flow chart which illustrates an example where the metric associated with UL coverage is whether a Random Access Response (RAR) is received.

FIG. 6 illustrates an example where the metric associated with UL coverage is whether a Random Access Response (RAR) is received 610. A physical layer metric that is associated with the UL interference scenario is desirable. One such metric may be to monitor the RAR after a Random Access (RA) transmission 600. In a typical scenario, the UL has worse coverage than the DL, i.e. there may be less TX power from a device compared to a controlling node, and hence if no RAR is received 610 within the RAR window 615, the most likely scenario is that the device UL transmission does not reach the controlling node 620. Furthermore, since the RA is typically ramped in transmission power, OoC may be detected on physical layer, first after a configured amount of failed RAR responses, the configuration may be received from the controlling node, or may be a pre-configured number. As long as a RAR is received, a device is considered inside network coverage 630 and should use D2D resources assigned from the controlling node. However, once OoC is determined 620 on the physical layer, it is forwarded to higher layer that then declare OoC. Once OoC is declared, the device assumes the device behaviour associated to out of coverage.

For example, the metric is based on UL sensing. Thus, a method may be to sense the UL resources to see if anything is transmitted. If the received UL resources signal level is below a first threshold, where the threshold may be pre-configured, or received/configured from the controlling node, OoC is detected and pre-configured D2D resources for D2D beacon signal transmission and D2D communication may be used. If the received UL resources signal level reaches a first threshold, IC is detected and frequency/time resources defined by the controlling node may be used.

Further examples on signals to be monitored are also possible. For example, a control channel provided by the controlling node can be monitored and determination whether IC or OoC can be determined based on whether the control channel can be decoded or not. Examples on such channels are PHICH, PDCCH and PCFICH. For example, if BLER is assumed to be below 1%, the control channel may be considered decodable. The control channel may be considered not to be decodable if BLER is assumed to be above 10%. BLER may be estimated as demonstrated above, e.g. based on SNR. A determination that the device is OoC can for example be made if a control channel is not successfully decoded within a time interval, e.g. 200 ms. The determination can be made based on one or more control channels. Here, it is to be noted that a multitude of signals and channels available in physical layer are possible, and all cannot be mentioned here. However, the same principle or principles as demonstrated above can apply. It should also be understood that a combination of two or more of the metrics as discussed above can be used for the determination of whether the device is IC or OoC.

In the description above we have discussed how a transmitting device should behave/react depending on whether device is IC or OoC, but similar approaches may be done for a receiving device as well. A metric is monitored (metrics as discussed above), and depending on IC or OoC different frequency/time resources (pre-configured, or configured by the controlling node) are monitored for D2D transmission.

In general, different individual UE behaviour may be associated to different D2D applications or functions (e.g., discovery, communication, relaying, transmission of synchronization signals, etc). Furthermore, individual and distinct UE behaviours may be associated to the functions associated to reception (e.g., the set of resources that a UE monitors) and transmission (e.g., the set of resources where a UE may transmit a certain signal/channel). For each of the above UE behaviours, a specific distinct IC/OoC metric may be associated, such that a UE might simultaneously assume, e.g., the "IC UE behaviour" with respect to reception of D2D signals and the "OoC UE behaviour" with respect to transmission of D2D data communication.

In the description below we say that the device (UE, modem, smartphone, sensor, laptop, M2M device, etc.) is in NW coverage (IC) respective out of NW coverage (OoC) when the device fulfill or not fulfill certain criteria (metric) w.r.t to a controlling node (remote node), so in a more general embodiment depending on whether certain metrics are fulfilled or not, we define certain actions (or behaviours) the device should do with regard to D2D communication.

Below, some different approaches/actions/behaviours are shown which a device may take in case the device determine a change in coverage state, i.e. going from IC to OoC and vice versa. The actions taken may be different depending on whether the device is in RRC_connected (active) state or RRC_idle (idle) state.

Therefore, examples are provided with one out-of-coverage state and two in-coverage states:

Out-of-coverage state, the device transmits D2D using pre-configured resources

In-coverage, broadcasted resources state: the device transmits D2D using resources broadcasted, e.g. on a broadcast channel, System Information Block for instance, from the controlling node.

In-coverage, granted resources state: the device transmits D2D using resources granted, i.e. resources configured in a dedicated message, from the controlling node During operation, a device is normally operating in either IC state or in OoC state. Therefore, during operation, associated triggering for transition to the other state, respectively, are described by examples in the following:

When operating in Out-of-coverage and triggered to transition to In-coverage state transition, the device may monitor a metric associated to DL sync from a controlling node. When the metric is considered indicating an in-coverage state, this may trigger the device to refrain from using pre-configured D2D resources, and instead search for information about in-coverage resources for D2D. Mutatis mutandis, any of the approaches demonstrated with reference to FIGS. 3 to 6 can be used when considering transitions from one state to the other.

Figure 7:
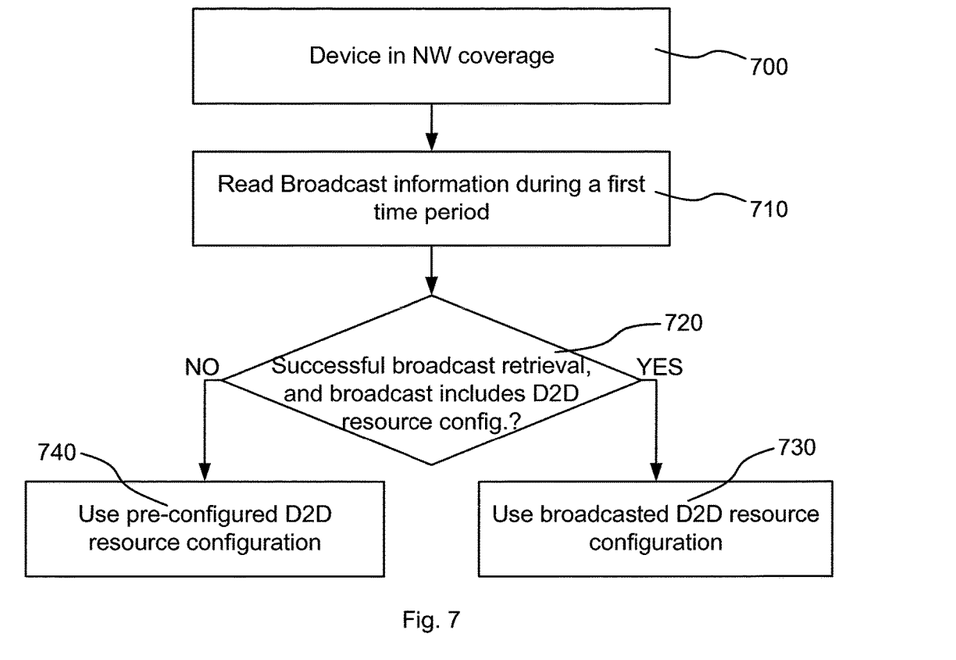
FIG. 7 is a flow chart which illustrates an example where the metric is based on UL sensing.

FIG. 7 illustrates an approach for a device in-coverage 700 with respect to a metric related to DL sync from a controlling node where the device will monitor controlling node broadcast information 710. If the device is able to successfully decode broadcasted information 720, and the broadcasted information comprises a D2D resource configuration 720 (YES), the device will use broadcasted resources for D2D transmissions 730. However, if the device fails to retrieve broadcasted information 720 (NO) from the controlling node, the device will use pre-configured resources for D2D transmissions 740.

Figure 8:
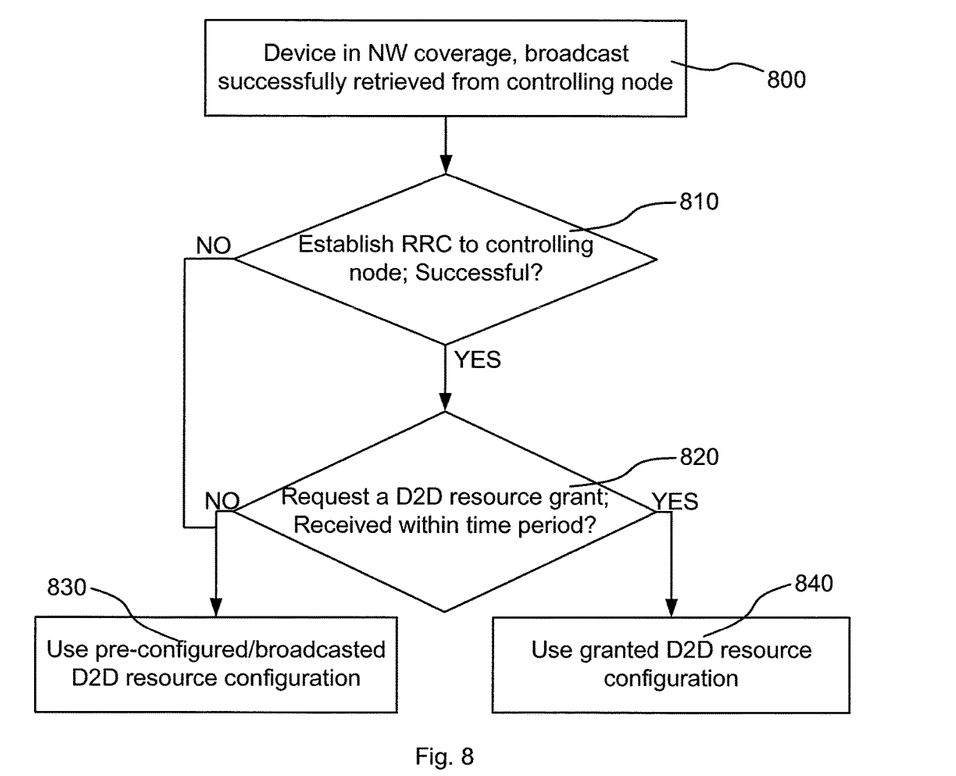
FIG. 8 is a flow chart which illustrates an approach for transition from In-coverage to In-coverage Granted resources.

FIG. 8 illustrates an approach for transition from In-coverage broadcasted resources to In-coverage Granted resources. A device in-coverage with respect to a metric related to DL sync from a controlling node, and the device has also has successfully decoded broadcasted information from the controlling node 800. The device tries to establish a RRC connection to the controlling node and checks whether successful 810. If the establishment fails 810 (NO), then the device will use pre-configured D2D resources, or broadcasted D2D resources if the controller node broadcast information comprises D2D resource configurations 830. If the RRC connection establishment is successful 810 (YES), the device will request D2D resources from the controlling node and check if granted within a time period 820. If no D2D resources are granted 820 (NO), the device will use pre-configured D2D resources, or broadcasted D2D resources if the controller node broadcast information comprises D2D resource configurations 830. However, if D2D resources are granted 820 (YES), the device will use granted resources for D2D transmissions 840.

Figure 9:
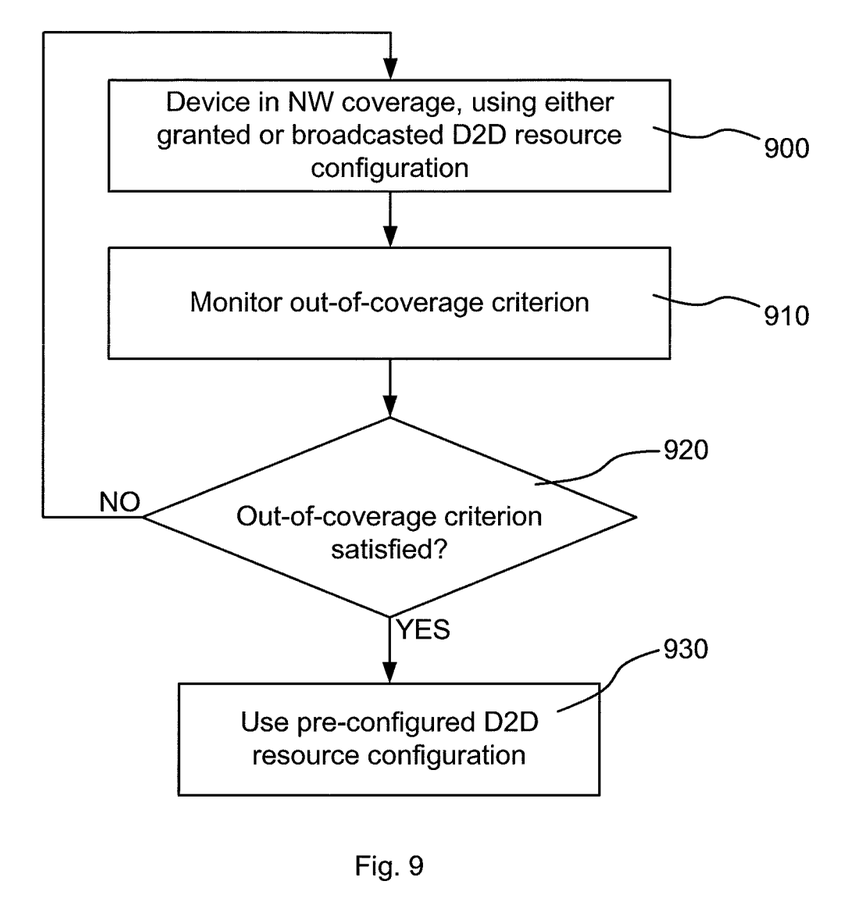
FIG. 9 is a flow chart which illustrates an approach for transition from in-coverage to out-of-coverage.

FIG. 9 illustrates an approach for transition from in-coverage to out-of-coverage. A device is in-coverage and considers either granted or broadcasted resources for D2D 900. The UE further monitors 910 one or more of the out-of-.coverage criteria as demonstrated above with reference to FIGS. 4 to 6, and evaluates if it is/they are met 920. If the criterion, or set of criteria, is met 920 (YES), then the UE refrains from using granted and broadcasted resources and instead considers pre-configured resources for D2D transmissions 930. If not, the UE continues 920 (NO) considering either granted or broadcasted resources for D2D 900. In some embodiments the grant is valid for a certain time period, and if the device trigs an OoC criteria, it may continue to use the granted time/frequency resources until the time period expires. Then the device starts to use the pre-configured resources 930.

Figure 10:
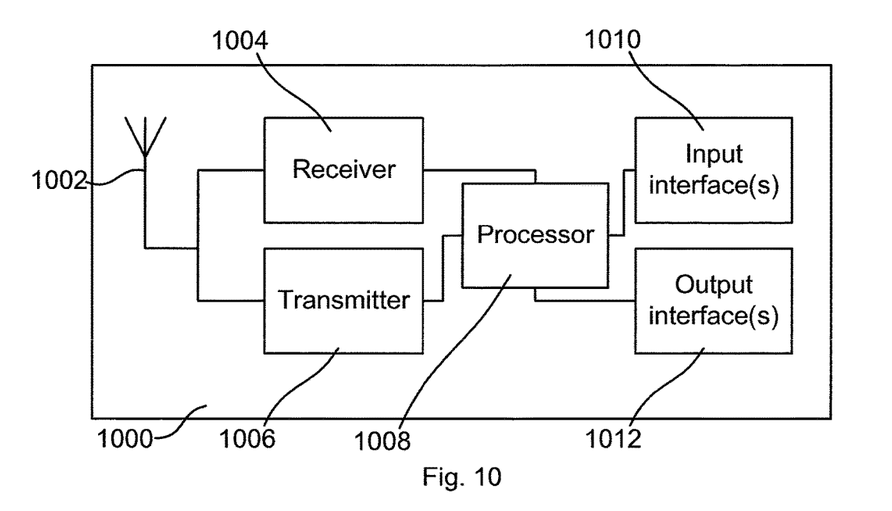
FIG. 10 is a block diagram schematically illustrating a communication device according to an embodiment.

FIG. 10 is a block diagram schematically illustrating a UE 1000 according to an embodiment. The UE comprises an antenna arrangement 1002, a receiver 1004 connected to the antenna arrangement 1002, a transmitter 1006 connected to the antenna arrangement 1002, a processing element 1008 which may comprise one or more circuits, one or more input interfaces 1010 and one or more output interfaces 1012. The interfaces 1010, 1012 can be user interfaces and/or signal interfaces, e.g. electrical or optical. The UE 1000 is arranged to operate in a cellular communication network, as demonstrated above. In particular, by the processing element 1008 being arranged to perform the embodiments demonstrated with reference to FIGS. 1 to 9, the UE 1000 is capable of communication within a 3GPP LTE network, and in particular LTE Direct, i.e. D2D, communication. The processing element 1008 can also fulfill a multitude of tasks, ranging from signal processing to enable reception and transmission since it is connected to the receiver 1004 and transmitter 1006, executing applications, controlling the interfaces 1010, 1012, etc.

Figure 11:
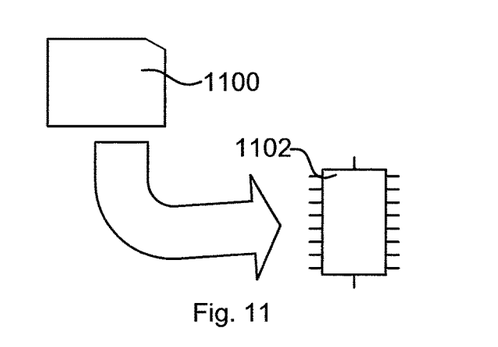
FIG. 11 schematically illustrates a computer-readable medium and a processing device.

The methods according to the present invention are suitable for implementation with aid of processing means, such as computers and/or processors, especially for the case where the processing element 1008 demonstrated above comprises a processor handling D2D resource use as discussed above. Therefore, there is provided computer programs, comprising instructions arranged to cause the processing means, processor, or computer to perform the steps of any of the methods according to any of the embodiments described with reference to FIG. 1 to 9. The computer programs preferably comprises program code which is stored on a computer readable medium 1100, as illustrated in FIG. 11, which can be loaded and executed by a processing means, processor, or computer 1102 to cause it to perform the methods, respectively, according to embodiments of the present invention, preferably as any of the embodiments described with reference to FIGS. 1 to 9. The computer 1102 and computer program product 1100 can be arranged to execute the program code sequentially where actions of the any of the methods are performed stepwise. The processing means, processor, or computer 1102 is preferably what normally is referred to as an embedded system. Thus, the depicted computer readable medium 1100 and computer 1102 in FIG. 11 should be construed to be for illustrative purposes only to provide understanding of the principle, and not to be construed as any direct illustration of the elements.

The invention claimed is:

1. A method for a device-to-device enabled cellular communication device arranged to operate with a cellular radio access network, the method comprising:

determining a physical layer metric based on at least one potentially received signal from a controlling node of the cellular radio access network;

determining based on the physical layer metric whether the cellular communication device is in coverage or out of coverage of the controlling node, the determining based on the physical layer metric includes determining whether one of a state and value associated with the metric has occurred;
if the cellular communication device is determined to be in coverage of the controlling node, using device-to-device resources assigned from the controlling node;
if the cellular communication device is determined to be out of coverage of the controlling node, using device-to-device resources which are preconfigured for out of coverage use; and
the physical layer metric includes one selected from a group consisting of:
a Random Access Response received from the controlling node, and the state associated with the metric includes whether the Random Access Response is received or not;
a broadcast signal received from the controlling node, and the state associated with the metric includes whether the broadcast signal is decodable or not; and
a control channel received from the controlling node, and the state associated with the metric includes whether the control channel is decodable or not.

2. The method of claim 1, wherein the determining based on the physical layer metric comprises at least one of comparing the value with a threshold and mapping the state to whether the cellular communication device is in coverage or out of coverage of the controlling node.

3. The method of claim 1, wherein the cellular communication device is determined to be in coverage of the controlling node if the Random Access Response was received within a predetermined number of Random Access attempts.

4. The method of claim 1, wherein the physical layer metric comprises one of a synchronization signal and a pilot signal received from the controlling node and filtered over a predetermined time, and the value associated with the metric comprises one of a signal level and signal-to-noise-and-interference-ratio of the one of the synchronization signal and pilot signal, and the cellular communication device is determined to be in coverage of the controlling node if the one of the signal level and signal-to-noise-and-interference-ratio is above the threshold.

5. The method of claim 4, wherein the synchronization signal comprises any of a Primary Synchronisation Signal and a Secondary Synchronisation Signal.

6. The method of claim 1, wherein the broadcast channel comprises any of a Master Information Block and a System Information Block.

7. The method of claim 6, wherein the threshold level is determined as a level at which the broadcast signal Block Error Rate is above a threshold.

8. The method of claim 1, wherein the cellular communication device is determined to be in coverage of the controlling node if the broadcast signal was decoded within a predetermined time interval.

9. The method of claim 1, wherein the control channel comprises any of a Physical Hybrid-ARQ Indicator Channel, a Physical Downlink Control Channel and a Physical Format Indicator Channel.

10. The method of claim 1, wherein the cellular communication device is determined to be in coverage of the controlling node if the control channel was decoded within a predetermined time interval.

11. The method of claim 1, further comprising determining a signal level on transmit resources assigned for uplink, wherein the metric comprises the determined signal level.

12. The method of claim 11, wherein the cellular communication device is determined to be out of coverage of the controlling node if the signal level is below the threshold.

13. The method of claim 1, wherein the cellular communication device is in an idle mode of operation in relation to the controlling node.

14. The method of claim 1, wherein the cellular communication device is camping on the controlling node.

15. The method of claim 1, further comprising sending the determination whether the cellular communication device is in coverage or out of coverage of the controlling node to a layer above a physical layer of the cellular communication device.

16. The method of claim 15, wherein when the determination is that the cellular communication device is out of coverage, the method proceeds with transmission of at least one of a device-to-device beacon signal and a device-to-device broadcast communication using the pre-configured resources.

17. A communication device for operating with a cellular radio access network and enabled for device-to-device communication, the communication device comprising:
a receiver configured to receive at least one potential signal from a controlling node of the cellular radio access network; and
a controller configured to determine a physical layer metric and based on the physical layer metric whether the communication device is in coverage or out of coverage of the controlling node by:
determining a physical layer metric based on at least one potentially received signal from the controlling node;
determining based on the physical layer metric whether the communication device is in coverage or out of coverage of the controlling node, the determining based on the physical layer metric includes determining whether one of a state and value associated with the metric has occurred;
if the communication device is determined to be in coverage of the controlling node, using device-to-device resources assigned from the controlling node;
if the communication device is determined to be out of coverage of the controlling node, using device-to-device resources which are preconfigured for out of coverage use; and
the physical layer metric includes one selected from a group consisting of:
a Random Access Response received from the controlling node, and the state associated with the metric includes whether the Random Access Response is received or not;
a broadcast signal received from the controlling node, and the state associated with the metric includes whether the broadcast signal is decodable or not; and
a control channel received from the controlling node, and the state associated with the metric includes whether the control channel is decodable or not.

18. A non-transitory computer storage media storing instructions which, when executed on a processor of a communication apparatus, causes the communication apparatus to perform a method, the method comprising:
determining a physical layer metric based on at least one potentially received signal from a controlling node of the cellular radio access network;
determining based on the physical layer metric whether the cellular communication device is in coverage or out of coverage of the controlling node, the determining based on the physical layer metric includes determining whether one of a state and value associated with the metric has occurred;
if the cellular communication device is determined to be in coverage of the controlling node, using device-to-device resources assigned from the controlling node;
if the cellular communication device is determined to be out of coverage of the controlling node, using device-to-device resources which are preconfigured for out of coverage use; and
the physical layer metric includes one selected from a group consisting of:
 a Random Access Response received from the controlling node, and the state associated with the metric includes whether the Random Access Response is received or not;
 a broadcast signal received from the controlling node, and the state associated with the metric includes whether the broadcast signal is decodable or not; and
 a control channel received from the controlling node, and the state associated with the metric includes whether the control channel is decodable or not.

* * * * *